United States Patent
Miller (10) Patent No.: US 11,957,082 B2
(45) Date of Patent: Apr. 16, 2024

(54) METHOD AND SYSTEM FOR REMOTE IRRIGATION SYSTEM MAINTENANCE

(71) Applicant: Lindsay Corporation, Omaha, NE (US)

(72) Inventor: Mark William Miller, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 0 days.

(21) Appl. No.: 17/549,322

(22) Filed: Dec. 13, 2021

(65) Prior Publication Data

US 2023/0180681 A1    Jun. 15, 2023

(51) Int. Cl.
| | |
|---|---|
| A01G 25/16 | (2006.01) |
| A01G 25/09 | (2006.01) |
| G05B 19/042 | (2006.01) |
| G06Q 50/02 | (2012.01) |

(52) U.S. Cl.
CPC ........... *A01G 25/16* (2013.01); *G05B 19/042* (2013.01); *A01G 25/092* (2013.01); *G05B 2219/2625* (2013.01); *G06Q 50/02* (2013.01)

(58) Field of Classification Search
CPC .... A01G 25/16; A01G 25/092; G05B 19/042; G05B 2219/2625; G06Q 50/02
See application file for complete search history.

(56) References Cited

U.S. PATENT DOCUMENTS

| | | | |
|---|---|---|---|
| 8,930,032 B2 | 1/2015 | Shupe et al. | |
| 9,468,162 B2 | 10/2016 | Weiler et al. | |
| 9,736,699 B1 * | 8/2017 | Rao | H04W 76/16 |
| 9,794,347 B2 | 10/2017 | Bomkamp et al. | |
| 11,464,177 B2 | 10/2022 | Devecigil et al. | |
| 2015/0355045 A1 * | 12/2015 | Solomon | G01M 3/007 702/36 |
| 2017/0349060 A1 * | 12/2017 | Abts | A01G 25/092 |
| 2018/0014480 A1 * | 1/2018 | Montgomery | G05B 19/042 |
| 2018/0141069 A1 * | 5/2018 | Lemkin | G05D 7/0676 |

(Continued)

FOREIGN PATENT DOCUMENTS

| | | |
|---|---|---|
| JP | 2006-006126 | 1/2006 |
| JP | 2011-092152 | 5/2011 |

(Continued)

OTHER PUBLICATIONS

International Search Report and Written Opinion dated Apr. 7, 2023 in related PCT Application No. PCT/US2022/080733, 10 pages.

*Primary Examiner* — Chad G Erdman
(74) *Attorney, Agent, or Firm* — Hovey Williams LLP (57) ABSTRACT

A computer-implemented method of relaying data of an irrigation system comprises establishing, via a mobile device communication element, a connection with a component associated with the irrigation system; requesting, via the mobile device communication element, current operational data representing real-time measurements associated with operations of the irrigation system; receiving, via the mobile device communication element, signals representative of a first data stream comprising the current operational data of the irrigation system; and transmitting, via the mobile device communication element, a second data stream comprising at least a portion of the first data stream to a remote computing device.

16 Claims, 3 Drawing Sheets

(56) References Cited

U.S. PATENT DOCUMENTS

2019/0297798 A1* 10/2019 Levine .................... G06F 9/542
2022/0007596 A1* 1/2022 Carey .................. A01G 25/092
2022/0106775 A1* 4/2022 Henry ................... G01F 15/063

FOREIGN PATENT DOCUMENTS

KR   10-2017-0037383       4/2017
WO        2017174149      10/2017
WO    WO-2020244048 A1 * 12/2020   ............. B63B 22/00

* cited by examiner

METHOD AND SYSTEM FOR REMOTE IRRIGATION SYSTEM MAINTENANCE

BACKGROUND

Maintenance of an irrigation system often requires an on-site technician with specific expertise. The technician must travel to the site of the irrigation system, review the machine status, and troubleshoot the issue. This often requires a lot of scheduling time and waiting for the technician to reach the on-site location. Delays incurred while the irrigation system is inoperable can negatively affect the quality of the crops irrigated by the system. Further, if the technician encounters problems troubleshooting the system, the technician often must call the system manufacturer for further help. The information available to the remote technician of the manufacturer during the service call is limited, and verbal communication about complex, technical issues over the phone is inefficient. Therefore, it is often difficult for the remote technician to help the on-site technician diagnose and repair the irrigation system.

The background discussion is intended to provide information related to the present invention which is not necessarily prior art.

SUMMARY OF THE INVENTION

The present invention solves the above-described problems and other problems by providing methods and systems of relaying data of an irrigation system that enable dynamic communication of operating conditions to a remote technician.

A computer-implemented method of relaying data of an irrigation system according to an embodiment of the present invention broadly comprises establishing, via a mobile device communication element, a connection with a component associated with the irrigation system; requesting, via the mobile device communication element, current operational data representing real-time measurements associated with operations of the irrigation system; receiving, via the mobile device communication element, signals representative of a first data stream comprising the current operational data of the irrigation system.

The method further includes transmitting, via the mobile device communication element, a second data stream comprising at least a portion of the first data stream to a remote computing device. By receiving and transmitting data streams comprising current operational data, the remote technician can see the necessary real-time information to help troubleshoot the irrigation system as it is going through tests and diagnose the problem. It further enables a user of the irrigation system who does not have the expertise of a technician to provide the necessary real-time information to a remote technician, thereby obviating the costs and risks associated with scheduling and waiting for an on-site technician.

A system for relaying data of an irrigation system constructed according to an embodiment of the present invention broadly comprises an irrigation system controller and a mobile device communication element. The irrigation system controller is associated with the irrigation system and includes an irrigation system communication element configured to receive current operational data of the irrigation system and transmit a first data stream comprising the current operational data. The mobile device communication element is in communication with the irrigation system controller. The mobile device communication element is configured to receive the first data stream and wirelessly transmit a signal representative of a second data stream comprising at least a portion of the current operational data.

A computer-implemented method of relaying data of an irrigation system according to another embodiment of the present invention broadly comprises transmitting, via an irrigation component communication element associated with the irrigation system, a first data stream comprising current operational data of the irrigation system; receiving, via a mobile device communication element, the first data stream; transmitting, via the mobile device communication element, a second data stream comprising at least a portion of the first data stream; and receiving, via a remote device communication element, the second data stream.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention provide improved, automated technologies for relaying data from an irrigation system to a remote device. More particularly, such automated technologies may include an irrigation component attached and/or connected to an irrigation system and having a communication element that is operable to transmit a data stream comprising current operational data, a mobile device of a user or a technician that executes a native application for connecting to the irrigation component and transmitting at least a portion of the current operational data through a communication network, and a remote computing device connected to the communication network and configured to receive the portion of the current operational data. The irrigation component may be configured to interface with, for example, the on-site technician's mobile device (which may be a cellular device) via Bluetooth® and/or WiFi signals. The mobile device may have an application that enables connection of the irrigation component to the remote computing device, such as a technician's desktop computer, via the communication network, such as a cellular network connected to a cloud network. The remote computing device may create a temporary service account for the irrigation system and thusly enable a remote technician at the remote computing device to connect to the irrigation component and access any and all operational and maintenance parameters.

This enables the remote technician to see, in near real-time, all information about the irrigation control and how the irrigation system is operating without the irrigation component requiring a single-purpose machine-to-machine connection. The remote technician can also obtain all information needed to troubleshoot the irrigation system without the irrigation system being permanently or continuously connected to the network. This also enables livestreaming of current operational data of the irrigation system as the irrigation system goes through certain troubleshooting procedures or tests. Additionally, this enables the remote technician to troubleshoot the issue prior to the on-site technician being involved by using a mobile device of the user. The mobile device of the user may also have the application mentioned above.

In some embodiments, the irrigation component may be or include a controller that is configured to collect predictive maintenance data and data about how individual systems/components on the irrigation system are operating. The irrigation component may be configured to determine if individual systems/components are out of normal operating parameters. It may also be configured to detect trends in the data. The irrigation component may also be configured to notify the user to schedule maintenance when a normal operating parameter goes out of range (e.g., exceeds a threshold). The irrigation component may also be configured to notify the remote technician at the remote device via the connection with the mobile device that maintenance should be scheduled due to a normal operating parameter going out of range and/or having a trend that will go out of range.

In some embodiments, the irrigation component may be configured to upload data via the connection with the mobile device that it stores during operation of the irrigation system. This data may comprise maintenance data, logging data, water flow data, fertilizer totalizing data, or the like. The irrigation component may be configured to automatically transmit this data to the mobile device when the mobile device is in range. The mobile device may be configured to receive a command that the data be transferred to the remote computing device. In some embodiments, the data may be stored on a cloud network for the user to retrieve at a later time via the mobile device.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detail description is, therefore, not to be taken in a limiting sense. The scope of the present invention is defined only by the appended claims, along with the full scope of equivalents to which such claims are entitled.

Exemplary System

Figure 1:
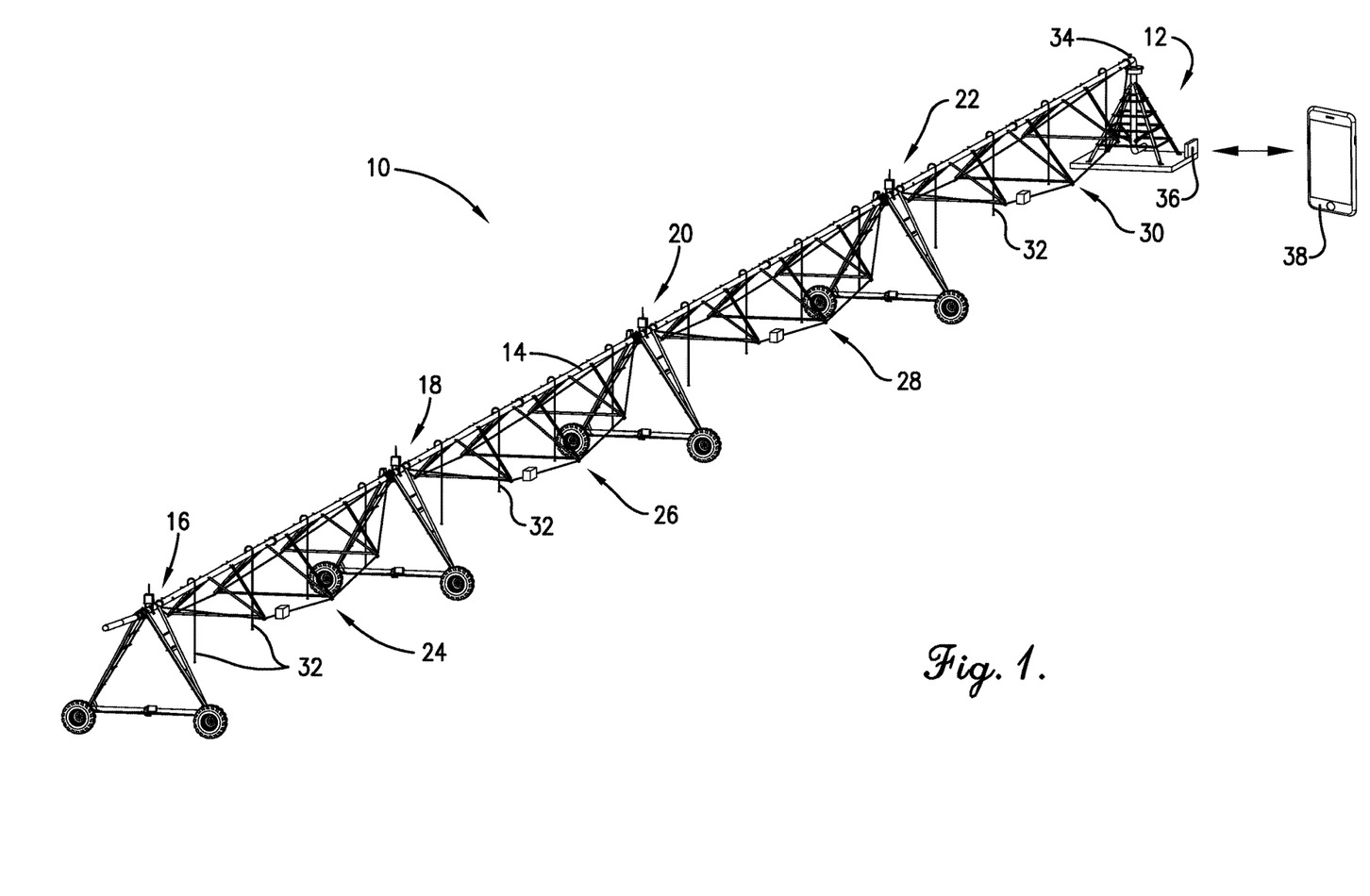
FIG. 1 illustrates an exemplary irrigation system in which embodiments of the present invention may be implemented for relaying data from the irrigation system.

Turning to FIG. 1, an exemplary irrigation system 10 for implementing embodiments of the invention is illustrated. The illustrated irrigation system 10 is a pivot irrigation system, but can be any other irrigation system, such as a lateral move irrigation system. The irrigation system 10 may have access to a hydrant, well, water tank, or other source 12 of water and may also be in fluid communication with a tank or other source of agricultural products to inject fertilizers, pesticides, and/or other chemicals into the water for application during irrigation.

The irrigation system 10 may comprise a number of spaced-apart mobile towers 16, 18, 20, 22, a fluid-distribution conduit 14 in fluid communication with the water source 12 and supported by the towers 16, 18, 20, 22 above a field, a plurality of truss sections 24, 26, 28, 30 or other supports to form a number of interconnected spans that help support the conduit 14, a plurality of fluid emitters 32 that are in fluid communication with the conduit 14, one or more valves 34 for controlling flow of fluids to the emitters 32, and an irrigation component 36.

The irrigation component 36 may be configured to monitor operations of the irrigation system 10 and communicate with external devices, such as a mobile device 38. The irrigation component 36 may comprise a controller, a telematics device, a monitoring device, or the like. The irrigation component 36 may be configured to selectively supply power to one or more parts of the irrigation system 10, such as the motors or valves, and monitor an amount of power to various parts. The irrigation component 36 may be mounted on one of the towers 16, 18, 20, 22, on a platform connected to the towers (such as at the water source 12), and/or at a nearby irrigation system station or junction box.

The irrigation component 36 may be connected to a plurality of sensors that detect various operational data of the irrigation system 10 and components thereof. The operational data may comprise real-time measurements associated with operations of the irrigation system 10, including an amount of water applied, an amount of fertilizer applied, a speed of the irrigation system 10, a current and/or prior state indication, fault indication, status indication, power level indication, irrigation system location indication, a short circuit fault indication, a low-voltage indication, a high-voltage indication, an over-current indication, a loss of power indication, etc. The irrigation component 36 may be configured to transmit the operational data to the mobile device 38.

Figure 2:
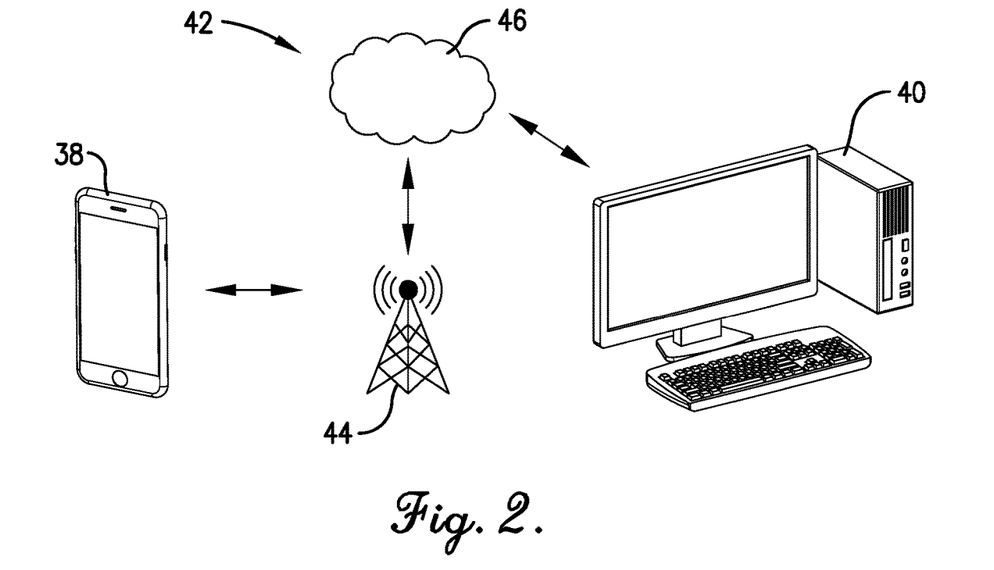
FIG. 2 illustrates an exemplary environment in which embodiments of a system for relaying data may be implemented.

Turning to FIG. 2, the mobile device 38 may be in communication with a remote computing device 40 via a communication network 42. The mobile device 38 may comprise a smart phone, tablet, laptop, or other electronic device, and may be associated with a user of the irrigation system 10 and/or a technician. The communication network 42 may include a wireless network 44, such as a cellular network, and a cloud network 46. The remote computing device 40 may comprise one or more smart phone, tablet, laptop computer, desktop computer, server computer, and/or other electronic device. The mobile device 38 may be configured to receive the operational data from the irrigation component 36 and transmit the operational data to the remote computing device 40 via the communication network 42. The remote computing device 40 may be configured to receive and/or download the operational data from the cloud network 46.

Figure 3:
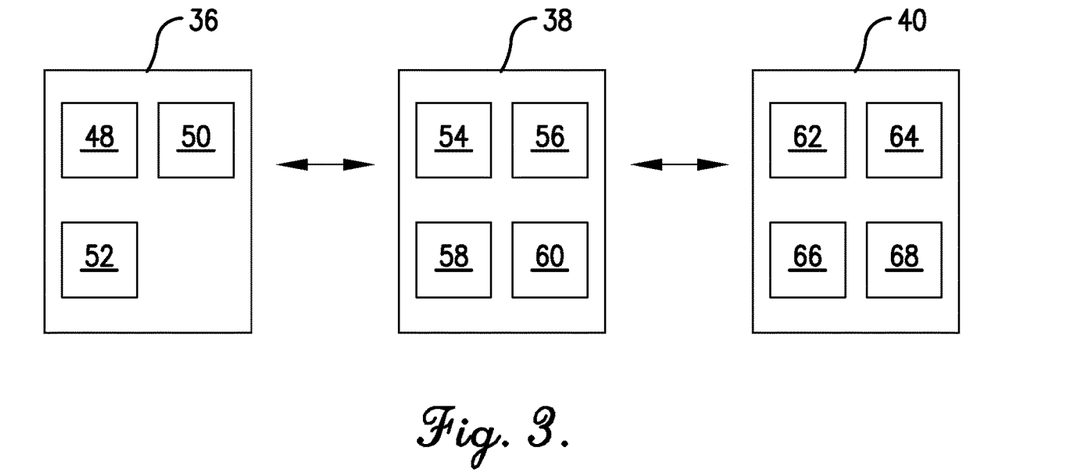
FIG. 3 is a schematic diagram depicting selected components of an exemplary system in block schematic form.

Turning to FIG. 3, in some embodiments, the irrigation component 36 may comprise a communication element 48, a memory element 50, and a processing element 52. The mobile device 38 may also include a communication element 54, a memory element 56, a processing element 58, and a user interface 60. The remote computing device 40 may similarly include a communication element 62, a memory element 64, a processing element 66, and a user interface 68.

The communication elements 48, 54, 62 may generally allow communication with systems or devices external to the irrigation component 36, mobile device 38, and remote computing device 40. The communication elements 48, 54, 62 may include signal or data transmitting and receiving circuits, such as antennas, amplifiers, filters, mixers, oscillators, digital signal processors (DSPs), and the like. The communication elements 48, 54, 62 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication elements 48, 54, 62 may be in communication with their respective processing elements 52, 58, 66 and the memory elements 50, 56, 64.

The memory elements 50, 56, 64 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 50, 56, 64 may be embedded in, or packaged in the same package as, the processing elements 52, 58, 66. The memory elements 50, 56, 64 may include, or may constitute, a "computer-readable medium". The memory elements 50, 56, 64 may store the instructions, code, code segments, software, firmware, programs, applications, apps, services, daemons, or the like that are executed by the processing elements 52, 58, 66.

The user interfaces 60, 68 generally allow a user to utilize inputs and outputs to interact with their respective devices 38, 40 and are in communication with their respective processing elements 58, 66. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display but may include any number of additional outputs, such as audio speakers, lights, dials, meters, printers, or the like, or combinations thereof, without departing from the scope of the present invention.

The processing elements 52, 58, 66 may include processors, microprocessors (single-core and multi-core), microcontrollers, DSPs, field-programmable gate arrays (FPGAs), analog and/or digital application-specific integrated circuits (ASICs), or the like, or combinations thereof. The processing elements 52, 58, 66 may generally execute, process, or run instructions, code, code segments, software, firmware, programs, applications, apps, processes, services, daemons, or the like. The processing elements 52, 58, 66 may also include hardware components such as finite-state machines, sequential and combinational logic, and other electronic circuits that can perform the functions necessary for the operation of the current invention. The processing elements 52, 58, 66 may be in communication with the other electronic components through serial or parallel links that include address busses, data busses, control lines, and the like.

For example, the user interface 60 of the mobile device 38 may receive an input representative of a request to establish a connection with the irrigation component 36 of the irrigation system 10. The processing element 58 of the mobile device 38 may be configured to receive a signal representative of the input and direct the communication element 54 to send a signal representative of a connection request to the communication element 48 of the irrigation component 36. The communication between the communication elements 48, 54 of the irrigation component 36 and the mobile device 38, respectively, may be wired and/or wireless communication. In some embodiments, the communication comprises signals conforming with Wi-Fi or Bluetooth® standards. In some embodiments, the mobile device 38 and the irrigation component 36 may be configured to automatically establish a connection once a previous connection has been established.

Once a connection is established, the communication element 48 of the irrigation component 36 may be configured to transmit a data stream comprising current operational data to the communication element 54 of the mobile device 38. The data stream may comprise a continuously and/or periodically updating flow of operational data of the irrigation system 10. The data stream may also include a unique identifier associated with the irrigation system 10. The communication element 54 of the mobile device 38 may be configured to transmit at least a portion of the data stream to the remote device 40. In some embodiments, the processing element 58 of the mobile device 38 may be configured to display portions of the data stream on the user interface 60.

The communication device 62 of the remote computing device 40 may be configured to receive the data stream from the mobile device 38 via the communication network 42. The processing element 66 of the remote computing device 40 may be configured to create a temporary account associated with the unique identifier of the irrigation system 10. The processing element 66 of the remote computing device 40 may also be configured to display at least a portion of the data stream on the user interface 68.

One or more of the processing elements 52, 58, 66 may be configured to analyze the operational data and/or store portions of the operational data on their respective memory elements 50, 56, 64. For example, the processing element 52 of the irrigation component 36 may be configured to determine when operational data exceeds a pre-set or predetermined threshold and store the operational data in the memory element 50 as historic operational data. The communication element 48 of the irrigation component 36 may be configured to transmit the historic operational data in the data stream. Additionally, the processing element 52 may be configured to store portions of the operational data as historic operational data and detect trends in the operational data. For example, the processing element 52 may be configured to perform regression analysis to determine the trends. The processing elements 58, 66 of the mobile device 38 and the remote computing device 40 may also be configured to analyze current operational data and/or historic operational data to detect trends.

In some embodiments, the processing element 52 may be configured to detect operational data that exceeds parameters and/or detect trends that indicate a threshold will be crossed within a predetermined amount of time. The processing element 52 may be configured to determine when the communication element 48 is in communication with the communication element 54 of the mobile device 38. The processing element 52 may be configured to direct the communication element 48 to send a signal representative of a notification. The notification may comprise an indication of an exceeded threshold or a maintenance recommendation. The processing element 58 of the mobile device 38 may be configured to receive the signal representative of the notification and direct the user interface 60 to display a graphic and/or text box stating and/or showing the notification. The text box may include the relevant data associated with the notification.

Figure 4:
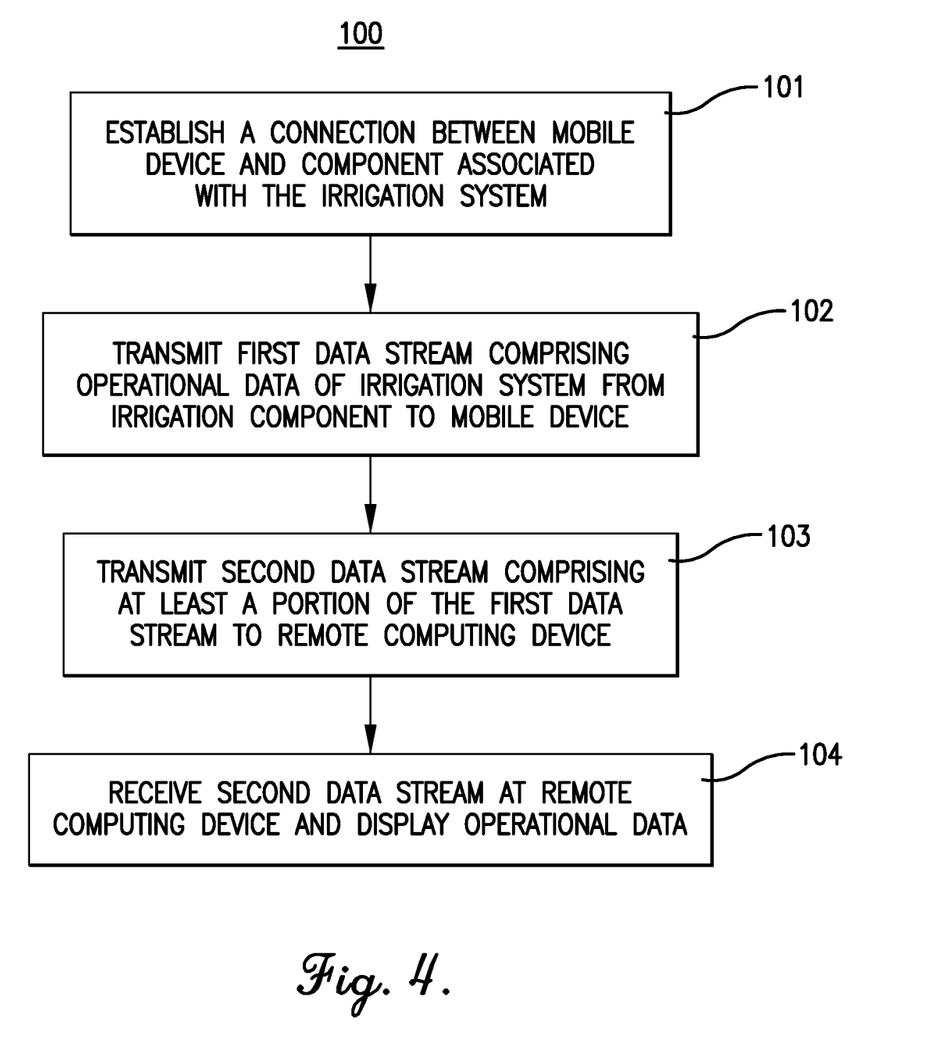
FIG. 4 is a flowchart depicting exemplary steps of a method according to an embodiment of the present invention.

The flow chart of FIG. 4 depicts the steps of an exemplary method 100 of relaying data of an irrigation system. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-3. The steps of the method 100 may be performed by the irrigation component 36, the mobile device 38, and/or the remote computing device 40 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, a connection between the irrigation component associated with the irrigation system and the mobile device is established. The connection may be between the communication elements of the irrigation component and the mobile device. This step may include requesting, via the mobile device communication element, current operational data representing real-time measurements associated with operations of the irrigation system. The connection may comprise a wired and/or wireless connection.

Referring to step 102, a first data stream comprising the current operational data of the irrigation system is transmitted to the mobile device. The first data stream may be received via the mobile device communication element and may be transmitted via wired and/or wireless signals representative of the first data stream. This step may also include detecting, via the processing element of the irrigation component, operational data that exceeds a threshold and storing portions of the operational data as historic operational data on the memory element of the irrigation component. The first data stream transmitted to the mobile device may include the historic operational data. The historic operational data may include data associated with the water application of the irrigation system and/or fertilizer application of the irrigation system. The first data stream may also include a unique identifier associated with the irrigation system. This step may include transmitting a signal representative of a notification that at least a portion of the operational data is above a threshold.

Referring to step 103, a second data stream comprising at least a portion of the first data stream is transmitted to the remote computing device. This step may include transmitting, via the mobile device communication element, wireless signals representative of the second data stream. This step may also include transmitting, via a communication element of the irrigation component, the historic operational data that exceeds a threshold. The second data stream may also include the unique identifier associated with the irrigation system.

Referring to step 104, the second data stream is received and presented at the remote computing device. This step may include displaying, via the user interface of the remote computing device, the portion of the second data stream. This step may include receiving in the second data stream, the unique identifier associated with the irrigation system and creating, via the processing element of the remote computing device, a temporary account associated with the identifier. This step may include performing a regression analysis, via the processing element of the remote computing device, on at least a portion of the operational data and/or the historic operational data to determine a trend.

The method 100 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method of relaying data of a mobile irrigation system, the computer-implemented method comprising:
    establishing, via a mobile device communication element, a connection with a component associated with the mobile irrigation system;
    requesting, via the mobile device communication element, current real-time operational data representing real-time measurements associated with real-time operations of the mobile irrigation system, the current real-time operational data comprising a speed of the irrigation system;
    receiving, via the mobile device communication element, signals representative of a first data stream comprising the current real-time operational data of the mobile irrigation system and historic operational data that exceeded a threshold;
    transmitting, via the mobile device communication element, a second data stream comprising at least a portion of the first data stream comprising the current real-time operational data and the historic operational data that exceeded the threshold to a remote computing device while the connection with the component associated with the mobile irrigation system is established; and
    displaying, via a user interface of the remote computing device, the portion of the first data stream comprising the current real-time operational data.

2. The computer-implemented method of claim 1, wherein the historic operational data comprises data associated with at least one of water application of the mobile irrigation system or fertilizer application of the mobile irrigation system.

3. The computer-implemented method of claim 1, further comprising performing a regression analysis, via a processing element of the remote computing device, on at least a portion of the historic operational data to determine a trend.

4. The computer-implemented method of claim 1, wherein the first data stream comprises an identifier associated with the irrigation system, and the second data stream includes the identifier, further comprising creating, via a processing element of the remote computing device, a temporary account associated with the identifier.

5. The computer-implemented method of claim 1, wherein receiving the first data stream comprises receiving, via the mobile device communication element, wireless signals representative of the first data stream.

6. The computer-implemented method of claim 1, wherein transmitting the second data stream comprises transmitting, via the mobile device communication element, wireless signals representative of the second data stream.

7. The computer-implemented method of claim 1, further comprising receiving, via the mobile device communication element, a signal representative of a notification that at least a portion of the current real-time operational data is above a threshold.

8. The computer-implemented method of claim 1, further comprising—
    detecting, via processing element of the component associated with the irrigation system, operational data that exceeds a threshold; and
    transmitting, via a communication element of the component associated with the irrigation system, the operational data that exceeds the threshold.

9. The computer-implemented method of claim 1, wherein the historic operational data comprises at least one of a power level indication, a short circuit fault indication, a low-voltage indication, a high-voltage indication, an over-current indication, or a loss of power indication.

10. A system for relaying data of a mobile irrigation system, the system comprising:
    an irrigation system controller associated with the mobile irrigation system, the irrigation system controller being configured to—
        receive current real-time operational data of the mobile irrigation system, the current real-time operational data comprising a speed of the irrigation system,
        determine whether the current real-time operational data exceeds a threshold,
        store the current real-time operational data that exceeds the threshold as historic operational data, and
        transmit the historic operational data and a first data stream comprising the current real-time operational data;
    a mobile device communication element in communication with the irrigation system controller, the mobile device communication element being configured to establish a connection with the irrigation system controller, receive the historic operational data and the first data stream through the connection, and wirelessly transmit a signal representative of the historic operational data and a second data stream comprising at least a portion of the current real-time operational data while the connection with the irrigation system controller is established; and
    a remote computing device in communication with the mobile device communication element, the remote computing device being configured to receive a signal representative of the second data stream comprising real-time operational data, and display at least a portion of the real-time operational data on a user interface.

11. The system of claim 10, wherein the historic operational data comprises at least one of a power level indication, a short circuit fault indication, a low-voltage indication, a high-voltage indication, an over-current indication, or a loss of power indication.

12. A computer-implemented method of relaying data of a mobile irrigation system, the computer-implemented method comprising:
    transmitting, via an irrigation component communication element associated with the mobile irrigation system, historic operational data and a first data stream comprising real-time operational data of the mobile irrigation system, the real-time operational data comprising a speed of the irrigation system;
    establishing, via a mobile device communication element, a connection with the irrigation component communication element;
    receiving, via the mobile device communication element, the historic operational data and the first data stream through the connection;
    wirelessly transmitting, via the mobile device communication element, signals representative of the historic operational data and the real-time operational data of the mobile irrigation system while maintaining the connection with the irrigation component communication element;

receiving, via a remote device communication element, the signals representative of the historic operational data and the real-time operational data; and displaying, via a user interface in communication with the remote device communication element, at least a portion of the real-time operational data.

13. The computer-implemented method of claim 12, further comprising performing a regression analysis, via a remote device processing element in communication with the remote device communication element, on at least a portion of the historic operational data to determine a trend.

14. The computer-implemented method of claim 12, wherein— receiving the first data stream comprises receiving, via the mobile device communication element, wireless signals representative of the first data stream.

15. The computer-implemented method of claim 12, further comprising— detecting, via an irrigation component processing element, operational data that exceeds a threshold;

storing, via the irrigation component processing element, the operational data that exceeds the threshold on an irrigation component memory element;

retrieving, via the irrigation component processing element, the operational data that exceeds the threshold from the irrigation component memory element;

transmitting, via the irrigation component communication element, the operational data that exceeds the threshold;

receiving, via the mobile device communication element, the operational data that exceeds the threshold;

transmitting, via the mobile device communication element, the operational data that exceeds the threshold; and receiving, via the remote device communication element, the operational data that exceeds the threshold.

16. The computer-implemented method of claim 12, wherein the historic operational data comprises at least one of a power level indication, a short circuit fault indication, a low-voltage indication, a high-voltage indication, an over-current indication, or a loss of power indication.

* * * * *